United States Patent
Widek (10) Patent No.: US 10,093,167 B2
(45) Date of Patent: Oct. 9, 2018

(54) ELECTRIC OR HYBRID ELECTRIC VEHICLE HAVING MULTIPLE DRIVE UNITS ARRANGED IN SEPARATE PARTS OF THE VEHICLE

(71) Applicant: VOLVO TRUCK CORPORATION, Göteborg (SE)

(72) Inventor: Per Widek, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/502,207

(22) PCT Filed: Aug. 14, 2014

(86) PCT No.: PCT/EP2014/002239
§ 371 (c)(1),
(2) Date: Feb. 7, 2017

(87) PCT Pub. No.: WO2016/023570
PCT Pub. Date: Feb. 18, 2016

(65) Prior Publication Data
US 2017/0217303 A1    Aug. 3, 2017

(51) Int. Cl.
*B60K 6/52* (2007.10)
*B60L 11/18* (2006.01)
(Continued)

(52) U.S. Cl.
CPC ............ *B60K 6/52* (2013.01); *B60K 6/28* (2013.01); *B60L 11/182* (2013.01);
(Continued)

(58) Field of Classification Search
CPC .. B60K 6/52; B60K 1/02; B60L 11/18; B60L 11/1803; B60L 11/1805; B60L 11/1816;
(Continued)

(56) References Cited

U.S. PATENT DOCUMENTS 4,762,191 A    8/1988  Hagin et al.
8,025,117 B2 *  9/2011  Bennett, Sr. ........... B60K 6/485
                                                180/65.1
(Continued)

FOREIGN PATENT DOCUMENTS

EP    2189320 A1   5/2010
EP    2199168 A1   6/2010
(Continued)

OTHER PUBLICATIONS

International Search Report (dated Apr. 21, 2015) for corresponding International App. PCT/EP2014/002239.
(Continued)

*Primary Examiner* — Katy M Ebner
(74) *Attorney, Agent, or Firm* — WRB-IP LLP (57) ABSTRACT

An articulated vehicle having at least two vehicle parts which are connected to and articulated relative to each other is provided. The vehicle includes a front vehicle part and at least one rear vehicle part arranged behind the front vehicle part with respect to a longitudinal direction of the vehicle. The front vehicle part has a first drive unit including at least an electric motor and a first energy storage system; and at least one rear vehicle part has a drive unit including at least an electric motor and an energy storage system. Each rear vehicle part includes an individual electrical system that is galvanically isolated from the front vehicle part and from each other at least under normal driving conditions.

15 Claims, 3 Drawing Sheets

(51) Int. Cl.
*B60K 6/28* (2007.10)
*B60L 11/16* (2006.01)
*B60K 6/30* (2007.10)
*B62D 59/04* (2006.01)
*B60K 17/356* (2006.01)

(52) U.S. Cl.
CPC ............. *B60L 11/1816* (2013.01); *B60K 6/30* (2013.01); *B60K 17/356* (2013.01); *B60L 11/16* (2013.01); *B60L 2200/18* (2013.01); *B60L 2200/36* (2013.01); *B60Y 2200/143* (2013.01); *B60Y 2200/1422* (2013.01); *B60Y 2200/91* (2013.01); *B60Y 2200/92* (2013.01); *B60Y 2300/91* (2013.01); *B60Y 2400/112* (2013.01); *B60Y 2400/114* (2013.01); *B60Y 2400/14* (2013.01); *B60Y 2400/16* (2013.01); *B62D 59/04* (2013.01); *Y10S 903/907* (2013.01); *Y10S 903/916* (2013.01)

(58) Field of Classification Search
CPC .............. B60L 11/1851; B60L 11/1877; B60L 2260/28
See application file for complete search history.

(56) References Cited

U.S. PATENT DOCUMENTS

| | | | | |
|---|---|---|---|---|
| 8,991,530 | B2* | 3/2015 | Langer | B60K 1/00 180/312 |
| 2003/0230443 | A1* | 12/2003 | Cramer | B60G 3/20 180/65.51 |
| 2004/0228760 | A1 | 11/2004 | Loh et al. | |
| 2006/0250902 | A1* | 11/2006 | Bender | B60K 6/30 369/1 |
| 2006/0276941 | A1* | 12/2006 | Sugita | B60K 6/44 701/1 |
| 2010/0224430 | A1* | 9/2010 | Bennett, Sr. | B60K 6/485 180/65.51 |
| 2011/0094807 | A1* | 4/2011 | Pruitt | B60K 1/04 180/65.6 |
| 2011/0198138 | A1* | 8/2011 | Sadrmajles | B60L 11/18 180/65.6 |
| 2014/0054100 | A1* | 2/2014 | Boskovitch | B60K 6/46 180/242 |
| 2015/0099600 | A1* | 4/2015 | Nilsson | B60K 6/52 475/150 |
| 2015/0306955 | A1* | 10/2015 | Knoblauch | B60K 1/02 180/242 |
| 2015/0318811 | A1* | 11/2015 | Ota | H02P 23/08 318/139 |
| 2016/0167522 | A1* | 6/2016 | Chen | B60L 1/003 180/53.8 |

FOREIGN PATENT DOCUMENTS

| | | |
|---|---|---|
| JP | H1056701 A | 2/1998 |
| JP | 2009165315 A | 7/2009 |
| JP | 2010124575 A | 6/2010 |
| JP | 2014050289 A | 3/2014 |
| WO | 2011043703 A1 | 4/2011 |

OTHER PUBLICATIONS

International Preliminary Report on Patentability (dated Oct. 10, 2016) for corresponding International App. PCT/EP2014/002239.

* cited by examiner

ELECTRIC OR HYBRID ELECTRIC VEHICLE HAVING MULTIPLE DRIVE UNITS ARRANGED IN SEPARATE PARTS OF THE VEHICLE

BACKGROUND AND SUMMARY

The invention relates to an electric or hybrid electric vehicle comprising multiple drive units which drive units are arranged in separate parts of the vehicle. The multiple drive units are arranged to drive individual wheels or wheel axles in the vehicle.

The invention can be applied in heavy-duty vehicles, such as trucks, buses construction equipment and other work vehicles. Although the invention will be described with respect to an articulated bus, the invention is not restricted to this particular vehicle, but may also be used in other vehicles such as articulated or non-articulated trucks and construction equipment using multiple drive units located in different parts of the vehicle.

A problem with electric or hybrid electric road vehicles comprising multiple electric drive units and an increasing number of electrical components is related to pole-chassis capacitance. It is desirable to keep the pole-chassis capacitance below a predetermined value. In this context there are standards that set limits for the pole-chassis capacitance; for instance, ISO6469-3 requires energies lower than 0,2 Joule (J). As an example, in a vehicle comprising a high voltage electric system an energy of 0,2 J at 750 Volts (V) corresponds to a pole-chassis capacitance of $700*10^{-9}$ Farad (nF) at 750 V.

Each additional component in an electrical system adds additional capacitance to the system. A typical hybrid system can comprise a battery, an electric motor, a DC/DC converter, a compressor and an air-conditioning unit, which can contribute approximately 100 nF each. In addition, components such as a junction box and contactors contribute 10 nF each, along with cabling adding approximately 1 nF/m. This places a limitation to the maximum number of components that can be added to the electrical system.

A similar problem relates to the pole-chassis isolation resistance. For example, the electrical resistance between any part of the traction voltage system electrical circuit and another electrical system or any exposed part of the chassis may be selected to be greater than or equal to 100 $\Omega$/V for DC components and 500 $\Omega$/V for AC components. Also the total electrical resistance between any part of the traction voltage system electrical circuit and another electrical system or any exposed part of the chassis may be selected to be greater than or equal to 5000 k$\Omega$. A system requirement of 500 $\Omega$/V would give a total resistance of 375 k$\Omega$ at a system voltage of 750 V, which would allow for a maximum of 13 components.

It is desirable to provide an improved vehicle electrical system that eliminates or at least minimizes that above problems.

By the provision of electric or hybrid electric road vehicles comprising multiple electric drive units, or propulsion units, which are provided with an electrical architecture according to the invention, one advantage is that the number of electrical components can be increased without exceeding a predetermined value for the pole-chassis capacitance.

According to an aspect of the invention, the electric or hybrid electric vehicle has multiple drive units located in different parts of the vehicle, wherein a first driven axle is driven by at least one electric drive unit, and at least one further driven axle is driven by at least one electric drive unit. An electric drive unit comprises one or more electric motor, for driving the axle or each wheel on the axle, and an electric motor drive (EMD) for controlling the one or more electric motor. Each driven axle has at least one electric drive unit connected to a junction box and at least one energy storage system forming an electrical system. The junction box is connected to the electric motor drive, the energy storage system and other electrical components in the individual electrical system by high voltage DC buses.

According to one example, a vehicle according to the invention can have multiple electric drive units located in different parts of the vehicle. The vehicle comprises a front steerable axle and one or more additional axles, wherein two or more axles are driven. For example, an axle located in one part of the vehicle can have a first drive unit comprising at least an electric motor and a first energy storage system. At least one additional axle in a separate part of the vehicle can have a second drive unit comprising at least one further electric motor and an energy storage system. Hereby an improvement is that each drive unit comprises an individual electrical system which is galvanically isolated from the electrical systems of other drive unit at least under normal driving conditions.

According to a further example, a vehicle according to the invention can have at least two vehicle parts which are connected to and articulated relative to each other. The vehicle comprises a front vehicle part arranged at a front end of the vehicle, which front vehicle part has a front steerable axle and a rear driven axle, and at least one rear vehicle part having a single axle, which rear vehicle part is arranged behind the front vehicle part with respect to a longitudinal direction of the vehicle. The front vehicle part has a first drive unit comprising at least an electric motor and a first energy storage system. At least one rear vehicle part has a drive unit comprising at least an electric motor and an energy storage system. Hereby an improvement is that each rear vehicle part that comprises an individual electrical system is galvanically isolated from the front vehicle part and from each other at least under normal driving conditions.

Both the examples above can use one drive unit with an individual electrical system for each driven axle or for driving each wheel on a driven axle. Also, each driven axle can be driven by an electric drive unit, comprising one or more electric motors, or by a hybrid drive unit, comprising an electric motor and an internal combustion engine. An electronic control unit is provided for conjoint control of the drive unit for each axle.

In this context, the term "normal driving conditions" is defined as conditions where the vehicle is being driven using a traction system comprising an internal combustion engine and/or an electric motor, either in a traction mode drawing power from an associated power source or in regenerative mode supplying power to an energy storage unit within the vehicle.

According to an aspect of the invention, the individual electrical systems arranged in different parts of the vehicle are connectable during charging of at least one energy storage system from an external source of electrical power. The external source of electrical power can be provided from a charger via a conductive arrangement, such as plug-in socket or a pantograph, or an inductive arrangement, such as inductive coils in the road surface. Preferably, the individual electrical systems are connected to a common external charging unit. In the above examples, the energy storage systems in the individual electrical systems are primarily intended to be charged during periods when the vehicle is standing still. However, the use of, for instance, an overhead pantograph or induction coils in the road surface allows the vehicle to be charged while travelling.

The common external charging unit can be connected to the energy storage systems of an electrical system via at least one contactor, preferably using one contactor for each electrical system. The charging unit is arranged to control the voltage supplied to the energy storage unit or units being charged. The contactor is arranged to interrupt the flow of current through a circuit or to interrupt the supply of power to a circuit in order to isolate a part of a circuit from the supply. A suitable contactor for this purpose is a charging switch unit (CSU).

According to one example, individual electrical systems are connectable by a DC/DC converter, which in itself can provide galvanic isolation between the DC voltage buses in the respective electrical systems. The DC/DC converter can be connected between junction boxes in the respective electrical system. The DC/DC converter can be operable to adjust voltage to each DC voltage bus during charging of at least one energy storage system from an external source of power. For instance, if the voltage difference between the charger and the electrical system to be charged is too great, then it is not possible to close the contactor between the charger and the electrical system. In this case, the charge current can be passed through the DC/DC converter to supply a suitable voltage.

According to a further example, individual electrical systems are connectable by a DC bus comprising at least one contactor. Preferably, but not necessarily, a contactor is provided in the DC bus connecting each vehicle part comprising an energy storage system. This allows the DC bus in the individual electrical system in one vehicle part to be galvanically isolated from a DC bus connecting individual electrical systems in other parts of the vehicle. For instance, the common charger can be connected to the vehicle at one location, where after its DC bus is split into multiple DC buses, one for each individual electrical system. Each DC bus from the charger is connected to the junction box of each individual electrical system. A contactor is provided for each individual electrical system, so that the split DC bus can be disconnected when charging from an external source is not performed and the individual electrical systems are galvanically isolated.

As indicated above, each driven axle can be driven by an electric drive unit, comprising one or more electric motors. A vehicle driven by electric motors only is often referred to as a full electric vehicle (FEV). Alternatively, at least one axle can be driven by a hybrid drive unit, comprising an electric motor and an internal combustion engine. The internal combustion engine can be used for driving the axle, via a transmission, or for generating power for an electric motor or for an electric energy storage system. When the charger is of the plug-in type, such a vehicle is often referred to as a plug-in hybrid electric vehicle (PHEV).

A vehicle according to the invention comprises individual electrical systems each provided with an energy storage system. The energy storage system can comprise at least one battery, at least one super-capacitor and/or at least one source of mechanical and/or hydraulic energy. Within the scope of the invention, one energy storage system can be energy optimized, comprising battery cells, while a further system can be power optimized, comprising a super-capacitor, a source of mechanical and/or hydraulic energy.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1A:
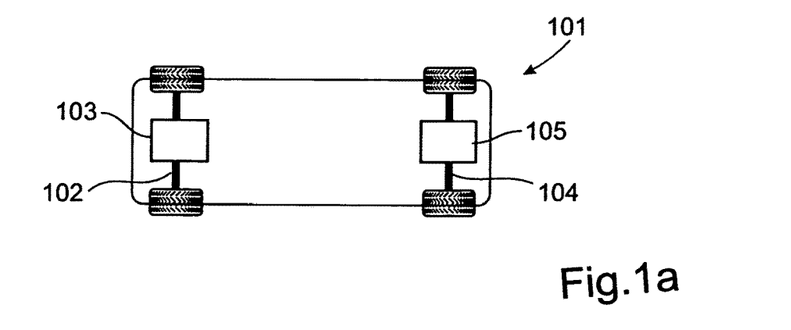
FIGS. 1A-D show schematic vehicles suitable for use with a propulsion system according to the invention.

FIGS. 1A-D show schematic vehicles suitable for use with a propulsion system according to the invention. FIG. 1A shows a schematic vehicle 101 having two driven axles 102, 104, where each driven axle can be driven by a first and a second electric drive unit 103, 105 comprising one or more electric motors. Hence, one motor can be arranged to drive one axle, or one motor can be arranged to drive each wheel on an axle. In this example, the first and second electric drive units 103, 105 are located in a front and a rear part of the vehicle 101, respectively. Alternatively, at least one axle can be driven by a hybrid drive unit, comprising an electric motor and an internal combustion engine.

Figure 1B:
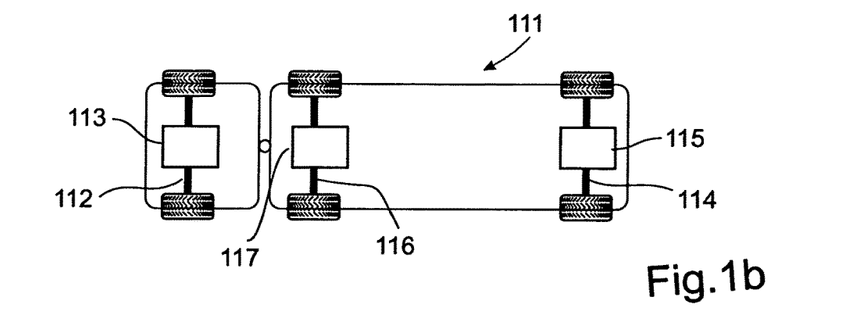

FIG. 1B shows a schematic vehicle 111 having three driven axles 112, 114, 116, where each driven axle can be driven by an electric drive unit 113, 115, 117, comprising one or more electric motors. As indicated above, one motor can be arranged to drive one axle, or one motor can be arranged to drive each wheel on an axle. In this example, a first electric drive unit 113 is located in a front part of an articulated vehicle and a second and third electric drive unit 115, 117 are located in a rear part of the articulated vehicle 101. Alternatively, at least one axle can be driven by a hybrid drive unit, comprising an electric motor and an internal combustion engine. This arrangement is suitable for construction machines, such as articulated dumpers.

Figure 1C:
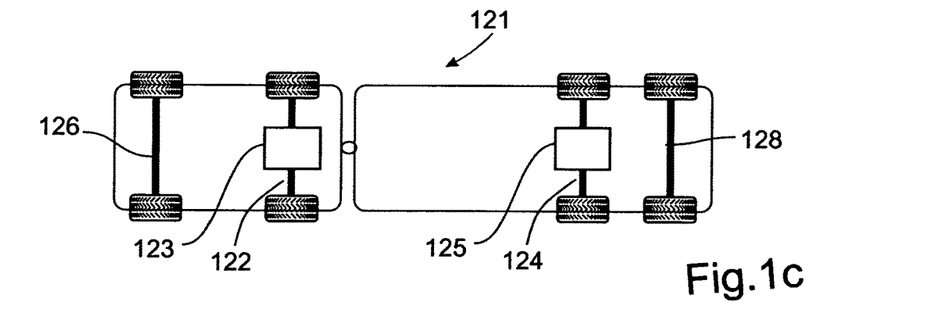

FIG. 1C shows a schematic vehicle 121 having two driven axles 122, 124, where each driven axle can be driven by an electric drive unit 123, 125 comprising one or more electric motors. Alternatively, at least one axle can be driven by a hybrid drive unit, comprising an electric motor and an internal combustion engine. One motor can be arranged to drive one axle, or one motor can be arranged to drive each wheel on an axle. In this example, the first electric drive unit 123 is located in a front part of an articulated truck, which front part also comprises a steerable axle 126. The second electric drive unit 125 is located in a rear part of the vehicle 121, which rear part also comprises a trailing axle 128. This arrangement is suitable for trucks comprising tractor-trailer combinations.

Figure 1D:
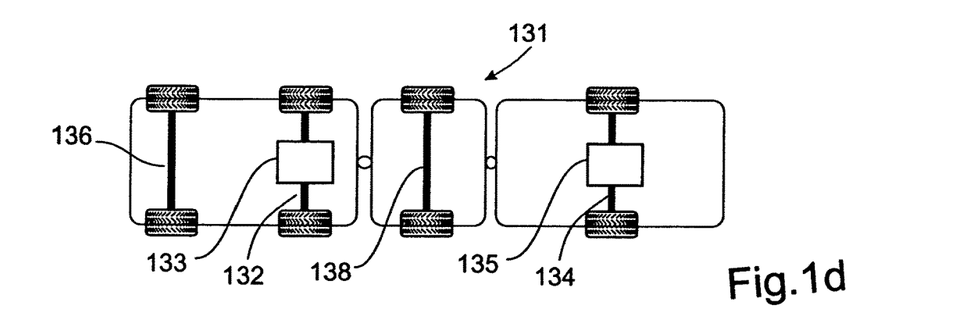

FIG. 1D shows a schematic vehicle 131 having two driven axles 132, 134, where each driven axle can be driven by an electric drive unit 133, 135, comprising one or more electric motors. Alternatively, at least one axle can be driven by a hybrid drive unit, comprising an electric motor and an internal combustion engine. One motor can be arranged to drive one axle, or one motor can be arranged to drive each wheel on an axle. In this example, the first electric drive unit 133 is located in a front part of an articulated bus, which front part also comprises a steerable axle 136. The second electric drive unit 135 is located in a rear part of the vehicle 131, which rear part is connected to an intermediate part comprising a non-driven axle 138. This arrangement is suitable for buses comprising multiple articulated sections, where at least two sections comprise driven axles.

In the examples shown in FIGS. 1A-D, each driven axle has at least one electric drive unit connected to a junction box and at least one energy storage system forming an electrical system. Electrical systems of this type will be described in further detail in connection with FIGS. 2 and 3 below. The individual electrical systems are galvanically isolated from each other during normal operation, when one or more energy storage systems in the vehicle is not being charged from an external power source This is only selected examples of vehicles suitable for use with the invention. Other vehicles having the driven axles mounted in alternative locations in the front and/or rear and one or more intermediate vehicle parts, are conceivable within the scope of the invention.

Figure 2:
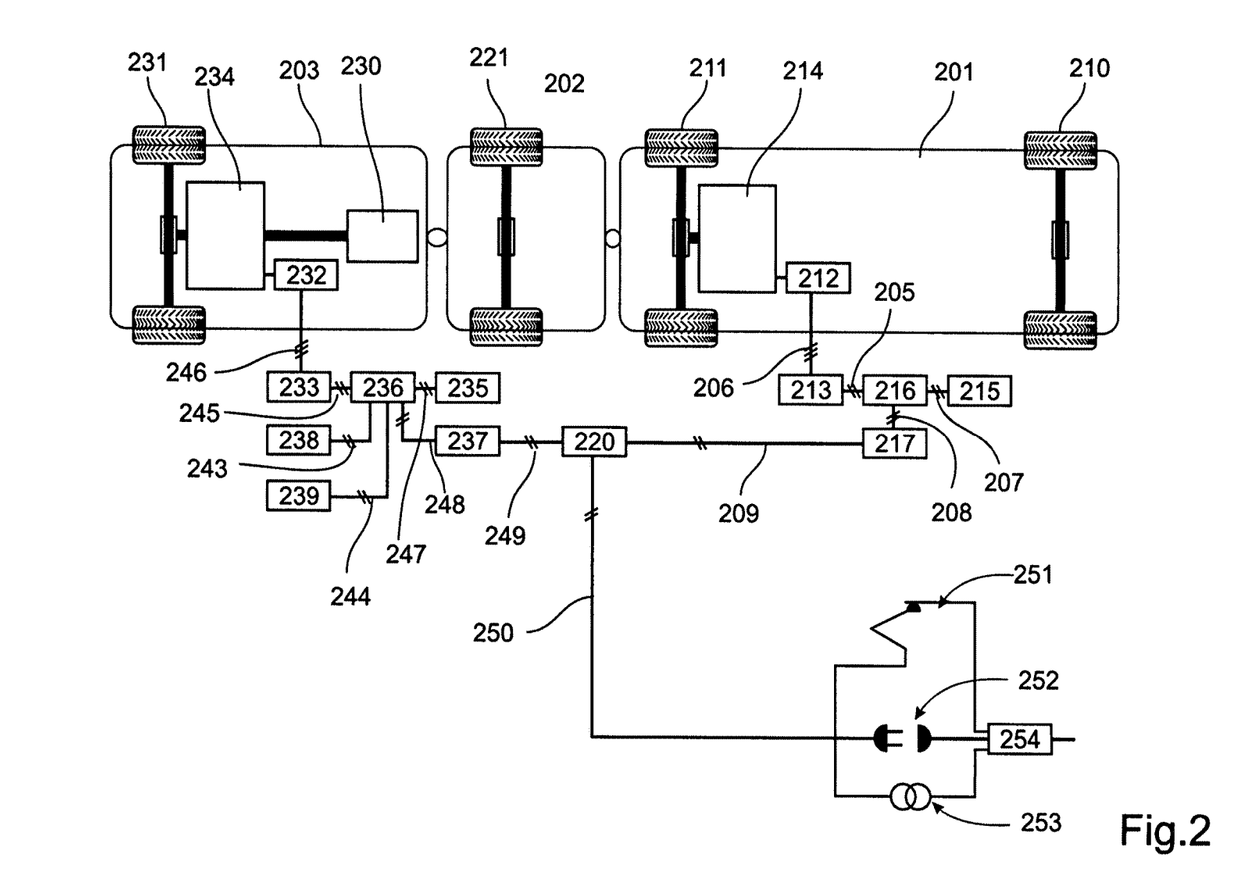
FIG. 2 shows a schematic vehicle according to a first embodiment of the invention.

FIG. 2 shows a schematic vehicle according to a first embodiment of the invention. For this particular example, an articulated vehicle of the type shown in FIG. 1D has been selected. The vehicle comprises a front 201, an intermediate 202 and a rear vehicle part 203 which are connected to and articulated relative to each other. The front vehicle part 201 is arranged at a front end of the vehicle and has a front steerable axle 210 and a rear driven axle 211. The intermediate vehicle part 202 has a single non-driven axle 221 and the rear vehicle part 203 has a single driven axle 231.

The front vehicle part 201 has a first drive unit in the form of a traction voltage system. The traction voltage system comprises an electric motor/generator 212 connected to a transmission 214 for driving the driven axle 211. The electric motor/generator 212 can supply a propulsive torque to the driven axle 211, or be driven by the driven axle 211 to generate electric power during regeneration. The electric motor/generator 212 is connected to an electric motor drive (EMD) 213, also termed a power electronics converter (PEC), which supplies three-phase AC current to the motor/generator 212. Three-phase AC current is indicated by three parallel lines across a voltage bus. In the current example, three-phase current is only supplied to the electric motors/generators. Two-phase current is indicated by two parallel lines across a voltage bus. The electric motor drive (EMD) 213 is in turn connected to a first energy storage system, in this case a high voltage battery pack 215 via a high voltage junction box 216. The traction voltage system comprises a number of high voltage DC buses 205, 206, 207, 208, 209 making up an operative high voltage bus, which buses are connected to the high voltage junction box 216 by connectors (not shown). In the example shown in FIG. 2, the high voltage junction box 216 can also be used for joining and distributing high voltage buses to a number of different electrical components.

A first DC bus 205 connects the high voltage junction box 216 to the electric motor drive (EMD) 213 and ultimately to the electric motor/generator 212 via a second bus 206. The first DC bus 205 is also referred to as a high voltage traction bus, while the second bus 206 is a three-phase AC bus. The electric motor drive (EMD) 213 comprises power electronics for controlling the electric motor/generator 212, including a motor control unit (MCU). Similarly, the transmission 214 is controlled by a transmission electronic control unit (not shown). In this example, the electric motor/generator 212 is an AC-motor supplied by the electric motor drive (EMD) 213. However, it is also possible to use a DC-motor within the scope of the invention.

A third DC bus 207 connects the junction box 216 to the high voltage battery pack 215. The high voltage battery pack 215 is provided with a battery management unit (BMU), comprising a power connector and electronics (not shown) for controlling the battery pack 215 and the cells making up the battery pack. The power connector typically comprises a pre-charge circuit having a pre-charge module for controlling power-up of a load. The pre-charge module can be of a solid state type and configured as a solid state module in series with a pre-charge resistor, for example a 10 ohm pre-charge resistor and that are together connected across the contacts of a contactor or relay. The relay is a main relay or main contactor for switching power on and off to the load. The load can be, for instance, the electric motor drive (EMD) 213 or a power take-off (PTO) load. The power that is switched on and off by this relay is the electric power from the high voltage battery pack 215. The on/off state of the relay is controlled by the BMU.

Additional DC buses can be provided for connecting the junction box to a DC/DC converter and a low voltage DC bus (not shown). The operation of such a DC/DC converter and the power supply to the low voltage DC bus will not be described in further detail here. The junction box can also be connected to one or more electric Power Take-Off loads (ePTO:s), or high voltage electrical loads (not shown). In FIG. 2 these buses are indicated for the rear vehicle part only. In practice, one DC bus can supply multiple loads and/or several DC buses can supply individual loads.

The junction box 216 and each control unit can also be connected to a wire harness in order to communicate with a central electronic control unit (not shown), for instance via a CAN bus. The wire harness can be connected to the central electronic control unit and is used for transmitting/receiving control and/or sensor signals to/from the control units. The central electronic control unit can be a separate unit or be arranged adjacent or in the junction box 216.

A fourth DC bus 208 connects the junction box 216 to a charging switch unit 217. The charging switch unit 217 is arranged to disconnect the traction voltage system in the front vehicle part 201 from the rest of the vehicle 202, 203. In this way the front vehicle part 201 is galvanically isolated from the rear and intermediate vehicle parts 202, 203, at least under normal driving conditions. A corresponding charging switch unit is provided in the rear vehicle part 203 described below.

A fifth DC bus 209 connects the charging switch unit 217 to a charge interface adapter 220 connected to the grid via a charger 254. The charge interface adapter 220 is a junction box which in the example in FIG. 2 is used for splitting a DC bus from the charger 254 to the DC buses of the respective front and rear vehicle parts 201, 203.

Alternatively, the charge interface adapter can be replaced by a DC/DC converter and a control unit for controlling the output voltage to the respective traction voltage system of the front and the rear part of the vehicle. Such a DC/DC converter can be connected directly to the respective junction box of the front and the rear part of the vehicle eliminating the need for charging switch units. The DC/DC converter would keep the front vehicle part 201 galvanically isolated from the rear and intermediate vehicle parts 202, 203 during normal (non-charging) operating conditions.

In the same way as the front vehicle part 201, the rear vehicle part 203 has a first drive unit in the form of a traction voltage system. The traction voltage system comprises an electric motor/generator 232 connected to a transmission 234 for driving the driven axle 231. The electric motor/generator 232 can supply a propulsive torque to the driven axle 231, or be driven by the driven axle 231 to generate electric power during regeneration. The rear vehicle part 203 is also provided with an internal combustion engine 230 connected to a transmission 234 for driving the driven axle 231, separately or together with the electric motor/generator 232. The internal combustion engine 230 can be controlled by an electronic engine control unit (not shown). The electric motor 232 can act as an external starter alternator motor that can be operated as a starter motor for the internal combustion engine 230. The electric machine 232 is mechanically coupled to the internal combustion engine 230 by the transmission 234, or by way of a suitable transmission such as a drive belt.

The electric motor/generator 232 is connected to an electric motor drive (EMD) 233, also which in turn is connected to a first energy storage system, in the form of a high voltage battery pack 235 via a high voltage junction box 236. The traction voltage system comprises a number of high voltage buses 243, 244, 245, 246, 247, 248, 249 making up an operative high voltage bus, which buses are connected to the high voltage junction box 236 by connectors (not shown). In the example shown in FIG. 2, the high voltage junction box 236, also termed hybrid junction box, can also be used for joining and distributing high voltage buses to a number of different electrical components.

A first DC bus 245 connects the high voltage junction box 236 to the electric motor drive (EMD) 233 and ultimately to the electric motor/generator 232 via a second bus 246. The first DC bus 245 is a two-phase high voltage traction bus, while the second bus 246 is a three-phase AC bus. The electric motor drive 233 comprises power electronics for controlling the electric motor/generator 232, including a motor control unit (MCU). As in the front vehicle part 201, the transmission 234 is controlled by a transmission electronic control unit (not shown). In this example, the electric motor/generator 232 is a three-phase AC-motor supplied by the electric motor drive (EMD) 233, as described above. However, it is also possible to use a DC-motor and a second DC bus within the scope of the invention.

A third DC bus 247 connects the junction box 236 to the high voltage battery pack 235. The high voltage battery pack 235 is provided with a battery management unit (BMU), comprising a power connector and electronics (not shown) for controlling the battery pack 235 and the cells making up the battery pack. The power connector typically comprises a pre-charge circuit having a pre-charge module for controlling power to a load. The pre-charge module can be of a solid state type and configured as a solid state module in series with a pre-charge resistor, for example a 10 ohm pre-charge resistor and that are together connected across the contacts of a contactor or relay. The relay is a main relay or main contactor for switching power on and off to the load. The load can be an inverter arranged in the electric motor drive 233. The power that is switched on and off by this relay is the electric power from the high voltage battery pack 235. The on/off state of the relay is controlled by the BMU.

A fourth DC bus 248 connects the junction box 236 to a charging switch unit 237. The charging switch unit 237 is arranged to disconnect the traction voltage system in the rear vehicle part 203 from the rest of the vehicle 201, 202. In this way the rear vehicle part 203 is galvanically isolated from the front and intermediate vehicle parts 201, 202, at least under normal driving conditions.

A fifth DC bus 249 connects the charging switch unit 237 to a charge interface adapter 220 connected to the grid. In this example the charge interface adapter 220 is a junction box, which has been described above.

Additional DC buses 243, 244 are provided for connecting the junction box 236 to a DC/DC converter 238 and one or more electric power take-offloads (ePTO:s) 239. The DC/DC converter 238 supplies a low voltage DC bus (not shown), such as a 12/24 V bus. The operation of such a DC/DC converter and the power supply to the low voltage DC bus will not be described in further detail here. In FIG. 2 these buses are indicated for the rear vehicle part only. In practice, one DC bus can supply multiple loads and/or several DC buses can supply individual loads. The low voltage DC bus can be connected to various 12 or 24 V loads (not shown) and an auxiliary 12 or 24 V storage battery. The low voltage DC bus is connected to the high voltage bus via the DC/DC converter 238 for maintaining the DC bus voltage.

As indicated above, the front and rear traction buses are connected to a common charge interface adapter 220 via the DC buses 209 and 249, respectively. This arrangement allows the traction voltage systems in each vehicle part to be galvanically isolated from each other under normal driving conditions. When it is desired to charge one or more of the energy storage systems 215, 235, then the charge interface adapter 220 is connected to a source of external energy. The source of external energy can be connected to the vehicle via conductive means, such as a pantograph 251 or a plug-in device 252, or inductive means 253. These sources of external energy also comprise a charger 254.

When the charge interface adapter 220 has been connected to a source of external energy then power is available in the DC buses 209, 249 to the respective traction voltage systems in the front and rear vehicle parts 201, 203. One or both of the charging switch units 217, 237 can then be controlled to supply a charge current to the respective energy storage system 215, 235. When charging is completed, the charging switch units 217, 237 are opened and the charge current is interrupted in order to ensure that the front and rear traction buses are galvanically isolated from each other.

Figure 3:
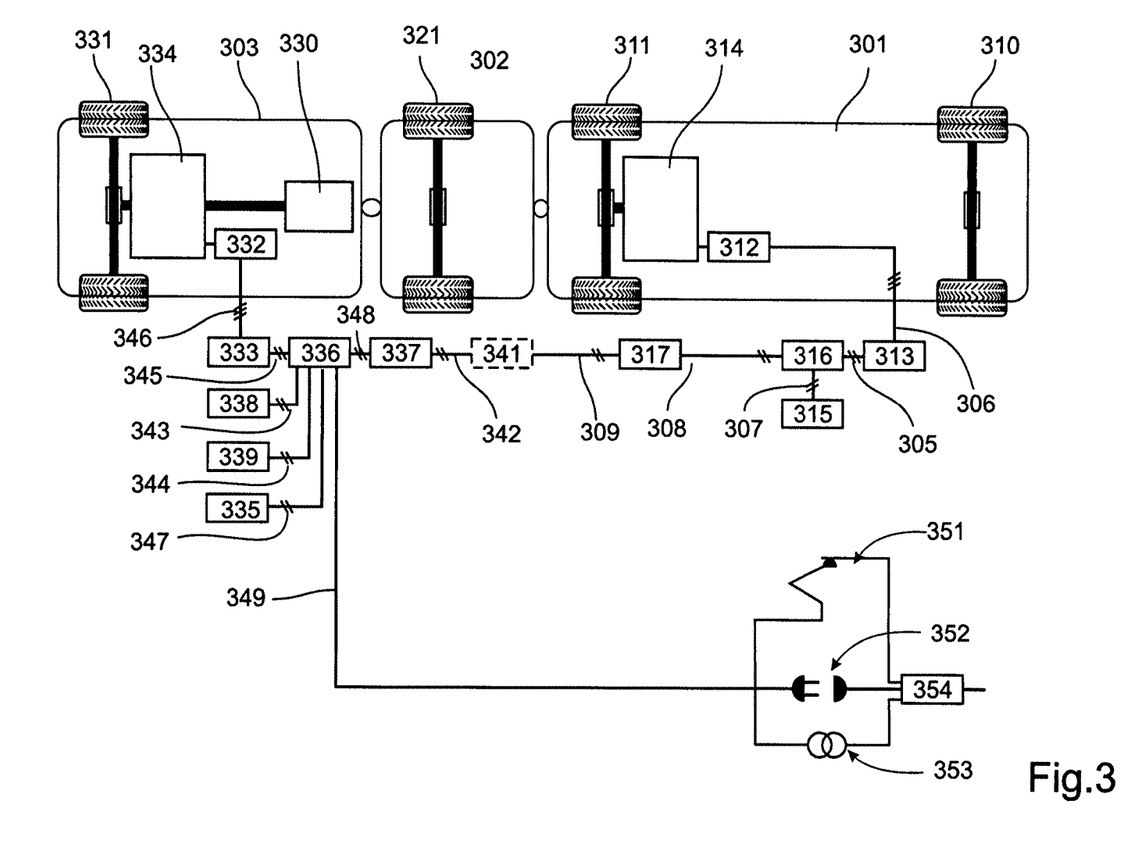
FIG. 3 shows a schematic vehicle according to a second embodiment of the invention.

FIG. 3 shows a schematic bi-articulated vehicle according to a second embodiment of the invention. The vehicle comprises a front 301, an intermediate 302 and a rear vehicle part 303 which are connected to and articulated relative to each other. The front vehicle part 301 is arranged at a front end of the vehicle and has a front steerable axle 310 and a rear driven axle 311. The intermediate vehicle part 302 has a single non-driven axle 321 and the rear vehicle part 303 has a single driven axle 331.

The front vehicle part 301 has a first drive unit in the form of a traction voltage system. The traction voltage system comprises an electric motor/generator 312 connected to a transmission 314 for driving the driven axle 311. The electric motor/generator 312 can supply a propulsive torque to the driven axle 311, or be driven by the driven axle 311 to generate electric power during regeneration. The electric motor/generator 312 is connected to an electric motor drive (EMD) 313, also termed a power electronics converter (PEC), which in turn is connected to a first energy storage system, in this case a high voltage battery pack 315 via a high voltage junction box 316. The traction voltage system comprises a number of high voltage buses 305, 306, 307, 308, 309 making up an operative high voltage bus, which buses are connected to the high voltage junction box 316 by connectors (not shown). In the example shown in FIG. 3, the high voltage junction box 316 can also be used for joining and distributing high voltage buses to a number of different electrical components.

A first DC bus 305 connects the high voltage junction box 316 to the electric motor drive (EMD) 313 and ultimately to the electric motor/generator 312 via a second bus 306. The first DC bus 305 is part of a two-phase DC voltage traction bus while the second bus 306 is a three-phase AC bus. The electric motor drive (EMD) 313 comprises power electronics for controlling the electric motor/generator 312, including a motor control unit (MCU). Similarly, the transmission 314 is controlled by a transmission electronic control unit (not shown). In this example, the electric motor/generator 312 is an AC-motor supplied by the inverter. However, it is also possible to use a DC-motor within the scope of the invention.

A third DC bus 307 connects the junction box 316 to the high voltage battery pack 315. The high voltage battery pack 315 is provided with a battery management unit (BMU), comprising a power connector and electronics (not shown) for controlling the battery pack 315 and the cells making up the battery pack. The power connector typically comprises a pre-charge circuit having a pre-charge module for controlling power to a load. The pre-charge module can be of a solid state type and configured as a solid state module in series with a pre-charge resistor, for example a 10 ohm pre-charge resistor and that are together connected across the contacts of a contactor or relay. The relay is a main relay or main contactor for switching power on and off to the load. The load can be an inverter arranged in the electric motor drive 313. The power that is switched on and off by this relay is the electric power from the high voltage battery pack 315. The on/off state of the relay is controlled by the BMU.

Additional DC buses can be provided for connecting the junction box to a DC/DC converter and a low voltage DC bus (not shown). The operation of such a DC/DC converter and the power supply to the low voltage DC bus will not be described in further detail here. The junction box can also be connected to one or more electric power take-off loads (ePTO:s), or high voltage electrical loads (not shown). In FIG. 3 these buses are indicated for the rear vehicle part only. In practice, one DC bus can supply multiple loads and/or several DC buses can supply individual loads.

The junction box 316 and each control unit can also be connected to a wire harness in order to communicate with a central electronic control unit (not shown), for instance via a CAN bus. The wire harness can be connected to the central electronic control unit and is used for transmitting/receiving control and/or sensor signals to/from the control units. The central electronic control unit can be a separate unit or be arranged adjacent or in the junction box 316.

A fourth DC bus 308 connects the junction box 316 to a first charging switch unit 317. The first, or front, charging switch unit 317 is arranged to disconnect the traction voltage system in the front vehicle part 301 from the rest of the vehicle 302, 303. A fifth DC bus 309 connects the first charging switch unit 317 to a corresponding second, or rear, charging switch unit 337 in the rear vehicle part 303. For all practical purposes, one of the charging switch units 317, 337 is redundant. However, for safety reasons it may be desirable to locate one charging switch unit 317, 337 in each of the front and rear vehicle parts 301, 303 to ensure that no part of the fifth DC bus 309 is live when the vehicle is not being charged from an external source. In this way the front vehicle part 301 is galvanically isolated from the rear and intermediate vehicle parts 302, 303, at least under normal driving conditions.

Alternatively, the charging switch units 317, 337 can be replaced by a DC/DC converter 341 (shown in dashed lines) and a control unit for controlling the output voltage to the respective traction voltage system of the front and the rear part of the vehicle. Such a DC/DC converter can be connected directly to the respective junction box of the front and the rear part of the vehicle eliminating the need for charging switch units. The DC/DC converter would keep the front vehicle part 301 galvanically isolated from the rear and intermediate vehicle parts 302, 303 during normal operating.

In the same way as the front vehicle part 301, the rear vehicle part 303 has a first drive unit in the form of a traction voltage system. The traction voltage system comprises an electric motor/generator 332 connected to a transmission 334 for driving the driven axle 331. The electric motor/generator 332 can supply a propulsive torque to the driven axle 331, or be driven by the driven axle 331 to generate electric power during regeneration. The rear vehicle part 303 is also provided with a second drive unit in the form of an internal combustion engine 330 connected to a transmission 334 for driving the driven axle 331, separately or together with the electric motor/generator 332. The internal combustion engine 330 can be controlled by an electronic engine control unit (not shown). The electric motor 332 can act as an external starter alternator motor that can be operated as a starter motor for the internal combustion engine 333. The electric machine 332 is mechanically coupled to the engine 330 by the transmission 334, or by way of a suitable transmission such as a drive belt.

The electric motor/generator 332 is connected to an electric motor drive (EMD) 333, also which in turn is connected to a first energy storage system, in the form of a high voltage battery pack 335 via a high voltage junction box 336. The traction voltage system comprises a number of high voltage buses 342 343, 344, 345, 346, 347, 348, 349 making up an operative high voltage bus, which buses are connected to the high voltage junction box 336 by connectors (not shown). In the example shown in FIG. 3, the high voltage junction box 336, also termed hybrid junction box, can also be used for joining and distributing high voltage buses to a number of different electrical components.

A first DC bus 345 connects the high voltage junction box 336 to the electric motor drive (EMD) 333 and ultimately to the electric motor/generator 332 via a second bus 346. The first DC bus 345 is a high voltage traction bus, while the second bus 346 is a three-phase AC bus. The electric motor drive 333 comprises power electronics for controlling the electric motor/generator 332, including a motor control unit (MCU). The transmission 334 is controlled by a transmission electronic control unit (not shown) in the same way as in the front vehicle part 301. In this example, the electric motor/generator 332 is an AC-motor, but it is also possible to use a DC-motor within the scope of the invention.

A third DC bus 347 connects the junction box 336 to the high voltage battery pack 335. The high voltage battery pack 335 is provided with a battery management unit (BMU), comprising a power connector and electronics (not shown) for controlling the battery pack 335 and the cells making up the battery pack. The power connector typically comprises a pre-charge circuit having a pre-charge module for controlling power to a load. The pre-charge module can be of a solid state type and configured as a solid state module in series with a pre-charge resistor, for example a 10 ohm pre-charge resistor and that are together connected across the contacts of a contactor or relay. The relay is a main relay or main contactor for switching power on and off to the load. The load can be an inverter arranged in the electric motor drive 333. The power that is switched on and off by this relay is the electric power from the high voltage battery pack 335. The on/off state of the relay is controlled by the BMU.

A fourth DC bus 348 connects the junction box 336 to a charging switch unit 337 and further to the traction voltage system of the first vehicle part 301. A fifth DC bus 349 connects the junction box 336 to a charger 354 connected to the grid.

Alternatively, the charging switch units 117, 337 can be replaced by a DC/DC converter 341 (shown in dashed lines) and a control unit (not shown) for controlling the output voltage to the respective traction voltage system of the front and the rear part of the vehicle. Such a DC/DC converter can be connected directly to the respective junction box 316, 336 of the front and the rear part of the vehicle eliminating the need for charging switch units. The DC/DC converter would keep the front vehicle part 201 galvanically isolated from the rear and intermediate vehicle parts 202, 203 during normal (non-charging) operating conditions. This arrangement would require Additional DC buses 343, 344 are be provided for connecting the junction box 336 to a DC/DC converter 338 and an one or more electric power take-off loads (ePTO:s) 339. The DC/DC converter 338 supplies a low voltage DC bus (not shown). The operation of such a DC/DC converter and the power supply to the low voltage DC bus will not be described in further detail here. In FIG. 3 these additional buses are indicated for the rear vehicle part only. In practice, one DC bus can supply multiple loads and/or several DC buses can supply individual loads. The low voltage DC bus can be connected to various 12 or 24 V loads (not shown) and an auxiliary 12 or 24 V storage battery. The low voltage DC bus is connected to the high voltage bus via the DC/DC converter 338 for maintaining the bus voltage.

As indicated above, the rear traction bus is connected to a common charger 354 via the DC bus 349. The front traction bus is connected to the common charger 354 via the DC bus 349, the rear junction box 336, the charging switch unit 337 and the DC bus 309 connecting the front and rear vehicle parts 301, 302.

This arrangement allows the traction voltage systems in each vehicle part to be galvanically isolated from each other under normal driving conditions. When it is desired to charge one or more of the energy storage systems 315, 335, then the charger 354 supplies power from a source of external energy. The source of external energy can be connected to the vehicle via conductive means, such as a pantograph 351 or a plug-in device 352, or inductive means 353. These sources of external energy also comprise a charger 254.

When the charger 354 has been connected to a source of external energy then power is available in the DC bus 349 and the respective traction voltage systems in the front and rear vehicle parts 301, 303 can be connected for charging. The traction voltage bus of the rear vehicle part 303 is connected to the DC bus 349 via the rear junction box 336 to supply a charge current to the rear energy storage system 335. The traction voltage bus of the front vehicle part 301 is connected by further controlling the second charging switch unit 337 in the rear traction voltage bus and the first charging switch unit 317 in the front traction voltage bus to supply a charge current to the front energy storage system 315. When charging is completed, the respective charging switch units 317, 337 are opened in order to ensure that the front and rear traction buses are galvanically isolated from each other.

The embodiments described above allow the galvanically isolated traction buses to be operated independently, whereby they can be operated at, for instance, different traction voltages. A further alternative is to one system (front or rear) to be energy optimized, while the other system is power optimized. The energy optimized system would comprise an energy storage system with battery packs optimized for supplying or recovering energy over longer, continuous periods of time. The power optimized system would comprise one or more supercapacitors, hydraulic accumulators and/or flywheels allowing rapid recovery or regeneration of energy for use during start/stop operation or for short accelerations. The power optimized system could be provided with a battery pack in addition to units for rapid energy recovery.

It is to be understood that the present invention is not limited to the embodiments described above and illustrated in the drawings; rather, the skilled person will recognize that many changes and modifications may be made within the scope of the appended claims.

The invention claimed is:

1. An electric or hybrid electric vehicle having multiple drive units located in different parts of the vehicle, the vehicle comprising:
   a first driven axle driven by at least one electric drive unit, and
   at least one further driven axle driven by a further at least one electric drive unit,
   wherein, for each of the first driven axle and the at least one further driven axle, the at least one electric drive unit and the further at least one electric drive unit are each connected to a respective junction box and to at least one energy storage system by a respective DC bus to form a respective individual electrical system for each of the first driven axle and the at least one further driven axle, thereby providing a plurality of individual electrical systems each of the individual electrical systems having a DC bus, and wherein DC buses of the individual electrical systems are galvanically isolated from each other at least under predetermined driving conditions.

2. A vehicle according to claim 1, wherein the DC buses of the individual electrical systems are connected to each other during charging of the at least one energy storage system from an external source of electrical power.

3. A vehicle according to claim 2, wherein the DC buses of the individual electrical systems are connected to the external source of electrical power via a conductive or an inductive arrangement.

4. A vehicle according to claim 2, wherein the DC buses of the individual electrical systems are connected to a common charging unit.

5. A vehicle according to claim 4, wherein the common charging unit is connected to the at least one energy storage system via at least one contactor.

6. A vehicle according to claim 1, wherein the DC buses of the individual electrical systems are connected to each other by a DC/DC converter.

7. A vehicle according to claim 6, wherein the DC/DC converter is arranged to connect the individual electrical systems during charging of the at least one energy storage system from an external source of electrical power.

8. A vehicle according to claim 1, wherein the individual electrical systems are connected to each other by a DC bus connecting each of the individual electrical systems comprising at least one contactor.

9. A vehicle according to claim 8, wherein the at least one contactor is provided in the DC bus connecting each al the individual electrical systems, the at least one energy storage system comprising a respective energy storage system for each of the individual electrical systems.

10. A vehicle according to claim 1, wherein the at least one electric drive unit comprises a hybrid propulsion unit.

11. A vehicle according to claim 1, wherein the at least one further electric drive unit comprises a hybrid propulsion unit.

12. A vehicle according to claim 10, wherein the hybrid propulsion unit comprises an electric motor/generator and an internal combustion engine.

13. A vehicle according to claim 1, wherein the energy storage system comprises at least one battery.

14. A vehicle according to claim 1, wherein the energy storage system comprises at least one supercapacitor.

15. A vehicle according to claim 1, wherein the energy storage system comprises at least one source of mechanical and/or hydraulic energy.

* * * * *